United States Patent
Pigott et al.

[11] Patent Number: 5,971,365
[45] Date of Patent: Oct. 26, 1999

[54] FENCE CONSTRUCTION

[76] Inventors: Patrick C. Pigott, P.O. Box 12589, Jackson, Miss. 39236; Woodruff J. Kozlow, 10720 Skyhawk Dr., New Port Richey, Fla. 34654; Davis E. Warren, 108 Sleepy Hollow La., Clinton, Miss. 39056

[21] Appl. No.: 08/975,986

[22] Filed: Nov. 21, 1997

[51] Int. Cl.⁶ .................................. E04H 17/14
[52] U.S. Cl. .................... 256/65; 256/24; 256/66
[58] Field of Search .................. 256/65, 59, 67, 256/24, 25, 26, 21, 22, 19, 66; 403/270, 269, 268

[56] References Cited

U.S. PATENT DOCUMENTS

| | | | |
|---|---|---|---|
| 2,070,306 | 2/1937 | Keller | 403/270 |
| 2,870,996 | 1/1959 | Helt | 256/22 |
| 3,420,504 | 1/1969 | Mulitz | 256/22 |
| 3,499,631 | 3/1970 | Helterbrand | 256/25 |
| 3,522,933 | 8/1970 | Braun, III | 256/65 X |
| 3,756,567 | 9/1973 | Murdock | 256/21 |
| 3,879,017 | 4/1975 | Maxcy et al. | 256/65 |
| 3,942,763 | 3/1976 | Helterbrand et al. | 256/65 X |
| 4,074,893 | 2/1978 | Coltrin | 256/21 |
| 4,202,532 | 5/1980 | Mills | 256/24 |
| 4,286,372 | 9/1981 | Batcheller | 256/65 X |
| 4,477,059 | 10/1984 | Willis | 256/65 |
| 4,553,741 | 11/1985 | Creasy et al. | 256/66 |
| 4,616,950 | 10/1986 | Morris | 256/65 X |
| 4,892,292 | 1/1990 | Russell | 256/66 |
| 5,362,030 | 11/1994 | Iler, Jr. et al | 256/65 |
| 5,372,354 | 12/1994 | Cacicedo | 256/65 X |
| 5,547,169 | 8/1996 | Russell | 256/67 |
| 5,645,270 | 7/1997 | Lawrence | 256/66 |
| 5,695,174 | 12/1997 | Tsai | 256/22 |
| 5,788,224 | 8/1998 | Platt | 256/65 X |

*Primary Examiner*—Harry C. Kim
*Attorney, Agent, or Firm*—Reginald F. Roberts, Jr.

[57] ABSTRACT

A fence erected on a supporting surface, and a method for erecting the fence. At least two adjacent fence posts are firmly and vertically mounted on a supporting surface such as the ground. Several blocks are fastened to each of the fence posts at predetermined heights. A fence panel is used to connect the fence posts to one another and in so doing erect the fence. The fence panel includes at least two horizontal runners and several vertical poles fastened to the horizontal runners. Notches are formed in each end of the horizontal runners, and the blocks are inserted in the notches, so that the fence panel is supported by the blocks and connects the fence posts to one another, thus erecting the fence.

3 Claims, 4 Drawing Sheets

27
FENCE CONSTRUCTION

BACKGROUND OF THE INVENTION

The present invention relates to fences. More particularly, the invention relates to the erection of a fence.

The prior art teaches how to construct fences. See, e.g., U.S. Pat. Nos. 4,477,059, 5,362,030, 4,892,292, 4,553,741, 5,645,270, 3,499,631, 4,074,893, and 5,547,169. What is particularly lacking in the prior art, however, is a disclosure of how to to erect a fence without cribbing, blocking, adjusting, or leveling. The present invention provides a fence which can be erected without making these adjustments.

SUMMARY OF THE INVENTION

The present invention in a first aspect provides a fence erected on a supporting surface. The fence comprises first and second fence posts fixedly and vertically mounted on the supporting surface, and a fence panel which includes a plurality of horizontal runners having first and second ends and a plurality of vertical poles fastened to the horizontal runners. A plurality of blocks are fastened to the first fence post at predetermined heights above the supporting surface. A plurality of blocks are fastened to the second fence post at the same heights as the blocks fastened to the first fence post. First and second notches are formed at the first and second ends, respectively, of each horizontal runner. The blocks fastened to the first fence post are disposed in the notches at the first ends of the horizontal runners, and the blocks fastened to the second fence post are disposed in the notches at the second ends of the horizontal runners, thereby connecting the first and second fence posts to one another, and erecting a fence on the supporting surface.

In a second aspect the invention provides a method for erecting a fence on a supporting surface. The method comprises (a) providing first and second fence posts; (b) fixedly and vertically mounting the first and second fence posts on the supporting surface; (c) fastening a plurality of blocks to the first fence post at predetermined heights above the supporting surface; (d) fastening a plurality of blocks to the second fence post at the same heights as the blocks fastened to the first fence post; (e) providing a fence panel which includes a plurality of horizontal runners having first and second ends, and a plurality of vertical poles fastened to the horizontal runners; (f) forming first and second notches at the first and second ends, respectively, of each horizontal runner; (g) disposing the blocks fastened to the first fence post in the notches at the first ends of the horizontal runners; and (h) disposing the blocks fastened to the second fence post in the notches at the second ends of the horizontal runners, thereby connecting the first and second fence posts to one another and erecting a fence on the supporting surface.

The term "runner" is herein defined as a rigid, elongated member.

The term "pole" is herein defined as a rigid, elongated member.

DETAILED DESCRIPTION OF THE INVENTION

Figure 1:
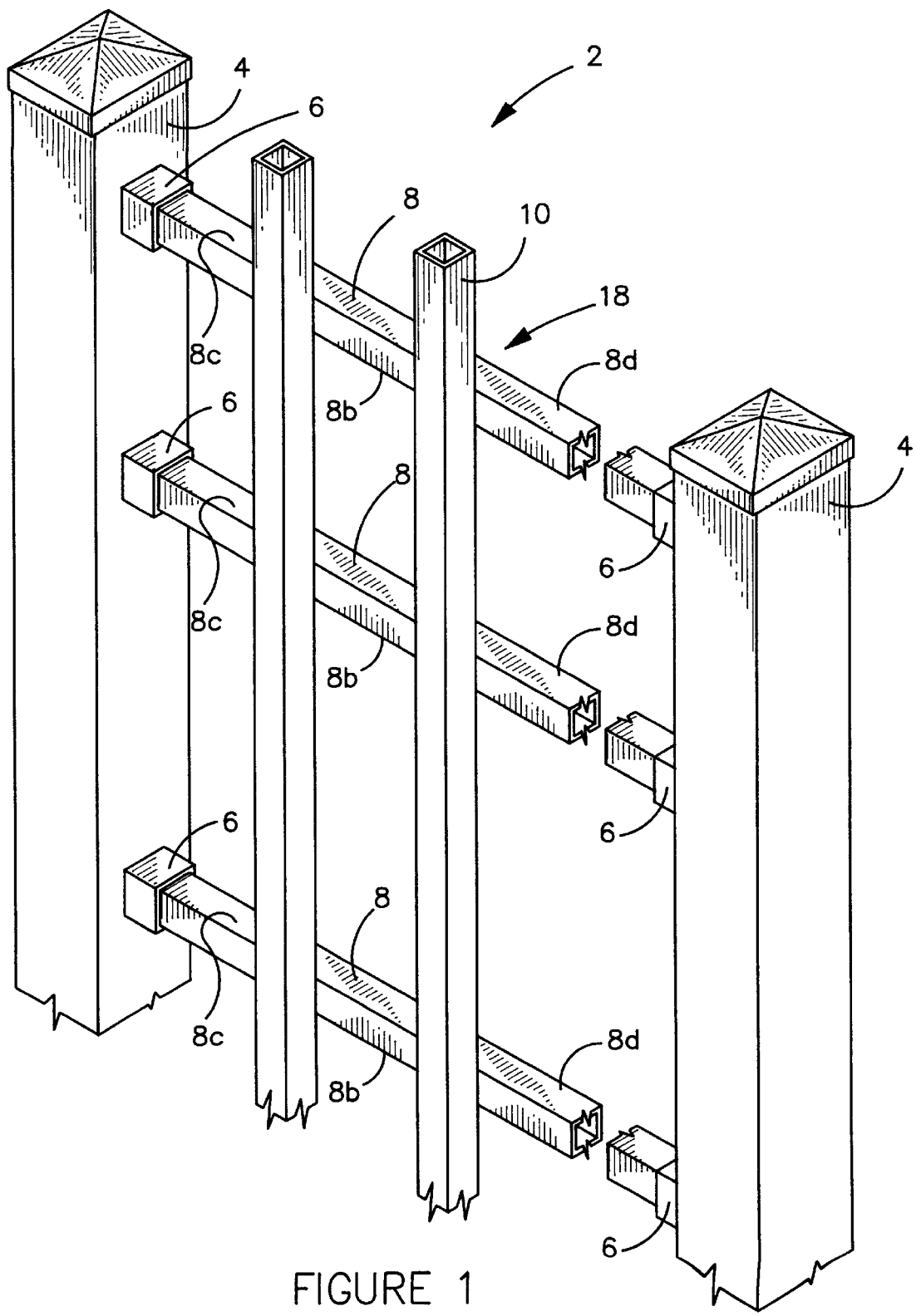
FIG. 1 is an isometric view of a fence made in accordance with the principles of the present invention.
Figure 2:
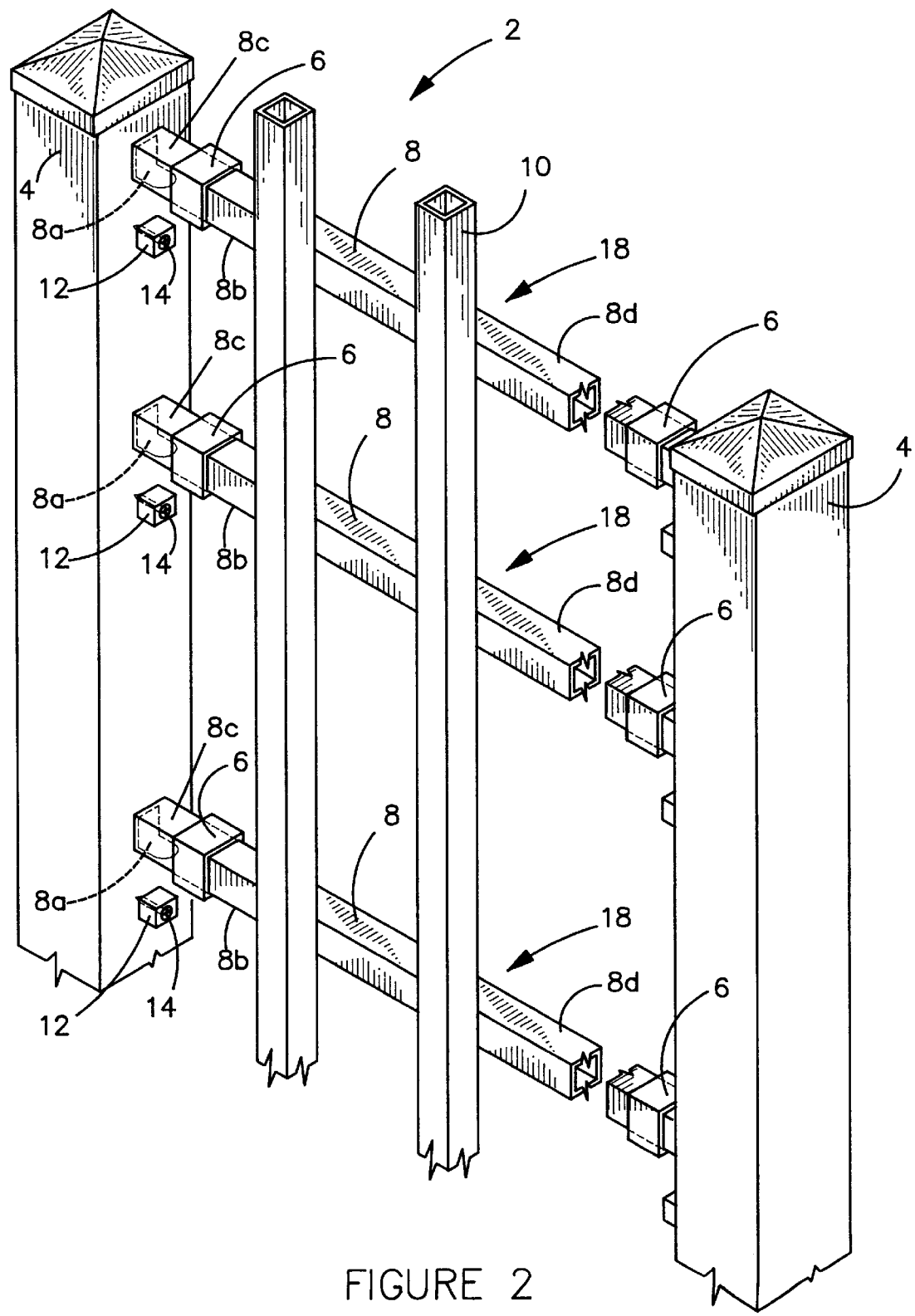
FIG. 2 is an isometric view of the fence shown in FIG. 1 in the process of construction.
Figure 7:
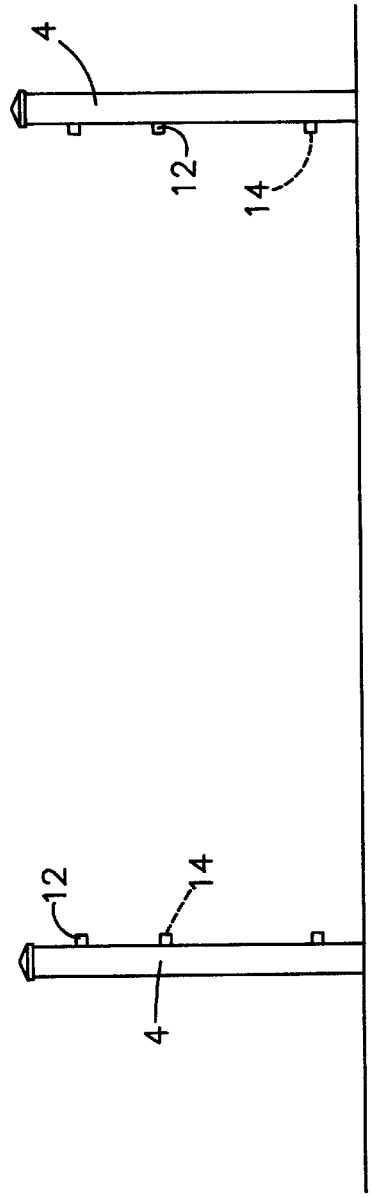
FIG. 7 is an isometric view of a portion of the fence shown in FIG. 1.
Figure 3:
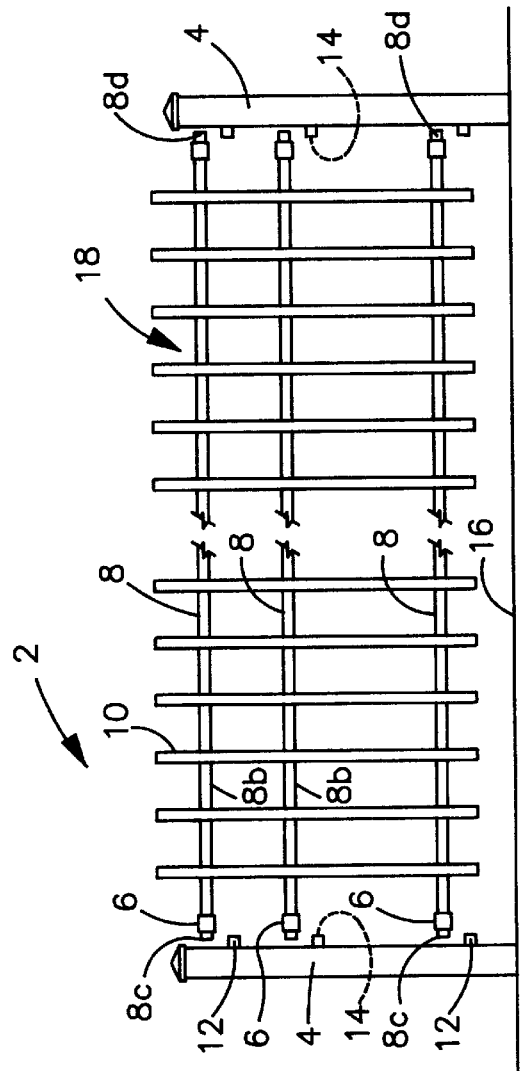
FIG. 3 is an isometric view of the fence shown in FIG. 1 in the process of construction.
Figure 6:
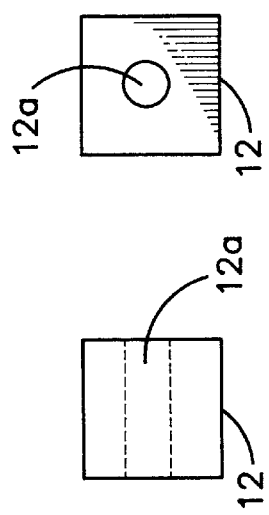
FIG. 6 is an isometric view of a portion of the fence shown in FIG. 1.
Figure 5:
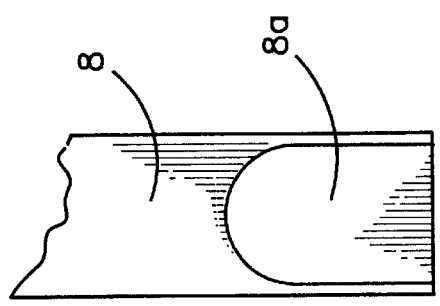
FIG. 5 is an isometric view of a portion of the fence shown in FIG. 1.
Figure 4:
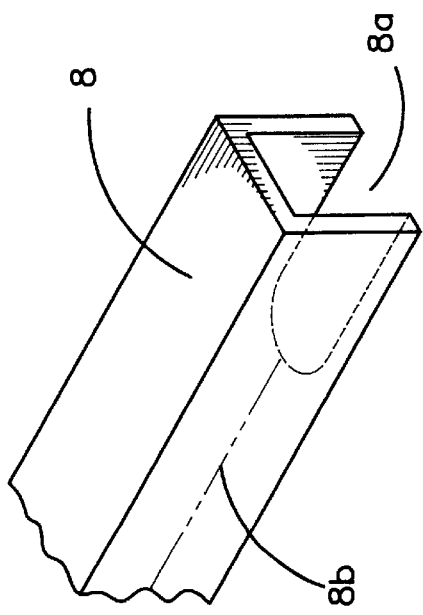
FIG. 4 is an isometric view of a portion of the fence shown in FIG. 1.

More specifically, reference is made to FIGS. 1–3, in which is shown a fence made in accordance with the principles of the present invention and generally designated by the numeral 2, in various stages of construction.

The final stage of construction, the completed fence 2, is shown in FIG. 1. The fence 2 in the process of construction is shown in FIGS. 2 and 3.

The fence 2 comprises first and second adjacent vertical fence posts 4 securely disposed in a supporting surface 16 (FIG. 3), which is substantially horizontal, and which may be e.g. cement but which is usually the ground. A fence panel 18 includes a horizontal runner 8 having first and second ends 8c and 8d, a seam-welded side 8b, and a plurality of vertical poles 10 fastened to the horizontal runner 8. The horizontal runner 8 includes first and second notches 8a at the first and second ends 8c and 8d in the seam-welded side 8b of the horizontal runner 8.

Reference is now made to FIGS. 4–9, in which are shown certain details regarding the construction of the fence 2.

Figure 9:
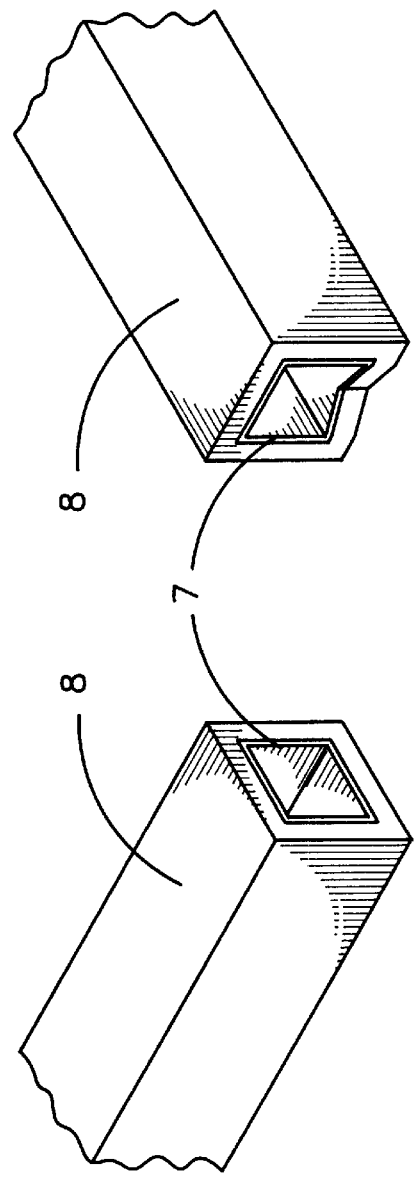
FIG. 9 an isometric view of a portion of the fence shown in FIG. 1.
Figure 8:
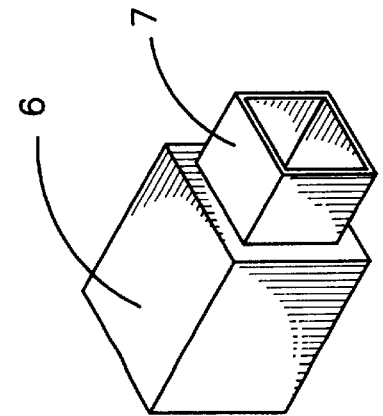
FIG. 8 is an isometric view of a portion of the fence shown in FIG. 1.

A plurality of plastic blocks 12 (FIG. 6) are fastened to the first and second fence posts 4 (FIGS. 1–3, 6, and 7) at predetermined heights above the supporting surface 16 by self-tapping screws 14 disposed in openings 12a in the blocks 12. The blocks 12 fastened to the first and second fence posts 4 are disposed in the first and second notches 8a at the first and second ends 8c and 8d, respectively, of the horizontal runners 8. (FIGS. 1–3, 8, and 9.) First and second metal outer sleeves 6 and first and second plastic inner sleeves 7 are then disposed and compressed around the first and second ends 8c and 8d of the horizontal runners 8 and around the blocks 12 disposed therein, thereby fastening the first and second ends 8c and 8d of the horizontal runners 8 to the first and second fence posts 4. FIG. 9 shows the sleeves 6 and 7 before and after crimping by compression.

The dimensions of the notches 8a conform to the width of the blocks 12, and are preferably from about one and one-quarter to one and three-quarters inches in length. The notching of the fence panel's 18 horizontal runner 8 is done by an automated machine or by a manual notcher.

The fence posts 4 are preset in the ground or other surface on a predetermined layout. The installation height of the fence 2 is then determined by establishing and following a horizontal line that is gauged with a transit. A "drill gauge and guide" is used to fix the transit-determined elevation on the posts 4. The "drill gauge and guide" then provides precise locations for drilling holes in the posts 4 for attachment thereto of the blocks 12, which are preferably plastic blocks, by a self-tapping mechanism.

This procedure allocates a place for the installer to hang the fence panel 18 without cribbing, blocking, adjusting, or having to level the fence 2, the reason being that the blocks 12 define a level, horizontal line for the horizontal runner 8, making further alignment unnecessary.

Prior to hanging the fence panel 18, the metal sleeve 6 is slid back about two and one-half inches over each end of the horizontal runner 8. Inside the metal sleeve is the plastic sleeve 7, which is approximately three one-hundredths of an inch in thickness. The plastic sleeve 7 fills and seals the space between the metal sleeve 6 and the horizontal runner 8. The plastic sleeve 7 gives way under compression, and conforms and molds between the metal sleeve 6 and the horizontal runner 8.

The sleeves 6 and 7 are crimped by compression against the horizontal runner 8, using a tool similar to a steel-cable crimper. The tool has a distinguishable punch-like projection that is used to crimp, deform, or indent the underside of the metal sleeve 6, as shown in FIG. 9.

The metal sleeve 6 is characterized as being slightly wider than the horizontal runner 8, and as having a length of about two inches. The metal is preferably steel.

Replacement or removal of the fence panel 18 is very simply done by cutting off all of the sleeves 6 and 7, and lifting the panel 18 from the blocks 12.

Optionally the poles 10 may be converted into pickets by capping the poles 10 with a conical cap (not shown).

The poles 10 are preferably welded to the horizontal runner 10, to ensure that they are securely fastened thereto.

The process described above for erecting the fence 2 shown in FIG. 1 is repeated as needed or desired to provide an extension thereof. Thus, an extended linear fence, or a square or rectangular fence enclosing a piece of property would comprise as many fence posts 4 as needed, and would comprise a plurality of blocks 12 fastened to two sides of some of the fence posts 4.

We claim:

1. A fence erected on a supporting surface, the fence comprising:

(a) first and second fence posts fixedly and vertically mounted on the supporting surface;

(b) a plurality of blocks fastened to the first fence post at predetermined heights above the supporting surface;

(c) a plurality of blocks fastened to the second fence post at the same heights as the blocks fastened to the first fence post;

(d) a fence panel including a plurality of horizontal runners having first and second ends, and a plurality of vertical poles fastened to the horizontal runners;

(e) first and second notches at the first and second ends, respectively, of each horizontal runner, the blocks fastened to the first fence post being disposed in the notches at the first ends of the horizontal runners, and the blocks fastened to the second fence post being disposed in the notches at the second ends of the horizontal runners, thereby connecting the first and second fence posts to one another, and erecting a fence on the supporting surface;

(f) first and second metal sleeves disposed and compressed around the first and second ends, respectively, of each horizontal runner and around the blocks disposed therein, to protect the first and second ends thereof from damage and to fasten the first and second ends of the horizontal runners to the first and second fence posts, respectively;

and (g) first and second plastic sleeves disposed between the first and second metal sleeves and the first and second ends, respectively, of the horizontal runners, to protect the first and second ends of the horizontal runners from rain and moisture, and to fill and seal the space between the first and second metal sleeves and the first and second ends of the horizontal runners.

2. A method for erecting a fence on a supporting surface, the method comprising the steps of:

(a) providing first and second fence posts;

(b) fixedly and vertically mounting the first and second fence posts on the supporting surface;

(c) fastening a plurality of blocks to the first fence post at predetermined heights above the supporting surface;

(d) fastening a plurality of blocks to the second fence post at the same heights as the blocks fastened to the first fence post;

(e) providing a fence panel which includes a plurality of horizontal runners having first and second ends, and a plurality of vertical poles fastened to the horizontal runners;

(f) forming first and second notches at the first and second ends, respectively, of each horizontal runner;

(g) disposing the blocks fastened to the first fence post in the notches at the first ends of the horizontal runners;

(h) disposing the blocks fastened to the second fence post in the notches at the second ends of the horizontal runners, thereby connecting the first and second fence posts to one another and erecting a fence on the supporting surface;

(i) disposing firsthand second metal sleeves around the first and second ends, respectively, of each horizontal runner and around the blocks disposed therein;

(j) compressing the first and second metal sleeves around the first and second ends, respectively, of each horizontal runner and around the blocks disposed therein, thereby protecting the first and second ends thereof from damage, and fastening the first and second ends of the horizontal runners to the first and second fence posts, respectively;

and (k) disposing first and second plastic sleeves between the first and second metal sleeves and the first and second ends of each horizontal runner before compressing the first and second metal sleeves around the first and second ends, respectively, of each horizontal runner, and around the blocks disposed therein, to protect the first and second ends of the horizontal runners from rain and moisture, and to fill and seal the space between the first and second metal sleeves and the first and second ends of the horizontal runners.

3. A fence erected on a supporting surface, the fence comprising:

(a) first and second fence posts fixedly and vertically mounted on the supporting surface;

(b) a plurality of rectangular blocks fastened to the first fence post at predetermined heights above the supporting surface;

(c) a plurality of rectangular blocks fastened to the second fence post at the same heights as the blocks fastened to the first fence post;

(d) a fence panel including a plurality of horizontal runners having first and second ends, and a plurality of vertical poles fastened to the horizontal runners;

(e) first and second notches at the first and second ends, respectively, of each horizontal runner, the blocks fastened to the first fence post being disposed in the notches at the first end of the horizontal runners, and the blocks fastened to the second fence post being disposed in the notches at the second ends of the horizontal runners, thereby connecting the first and second fence posts to one another, and erecting a fence on the supporting surface; and (f) first and second metal sleeves circumscribed and compressed around the first and second ends, respectively, of each horizontal runner and around the blocks disposed therein, to protect the first and second ends thereof from damage and to fasten the first and second ends of the horizontal runners to the first and second fence posts, respectively.

* * * * *